May 27, 1969

M. F. LYONS ET AL 3,446,703

METHOD OF OPERATING A NUCLEAR REACTOR

Filed Nov. 15, 1967

INVENTORS
BERNHARDT WEIDENBAUM
MARK F. LYONS
BY

ATTORNEY

United States Patent Office 3,446,703
Patented May 27, 1969

3,446,703
METHOD OF OPERATING A NUCLEAR REACTOR
Mark F. Lyons and Bernhardt Weidenbaum, San Jose, Calif., assignors to the United States of America as represented by the United States Atomic Energy Commission
Filed Nov. 15, 1967, Ser. No. 683,374
Int. Cl. G21c *3/02*
U.S. Cl. 176—37                                    3 Claims

ABSTRACT OF THE DISCLOSURE

A method of operating a nuclear reactor to achieve a high burnup of fissile fuel by removing a majority of the neutron-absorbing fission products from the reaction zone of the fuel element as they are created through central melting of the fissile fuel.

Background of the invention

This invention was developed in the course of, or under, Contract No. AT(04-3)-189, Project Agreement #17, with the Atomic Energy Commission.

This invention relates to nuclear reactors and systems associated with plural reactor components, including fuel in the molten state, and in particular to a process for operating a nuclear reactor which increases total fuel burnup by removal of neutron-absorbing fission products from the reaction zone during reactor operation.

It is the practice, in operating nuclear reactors in prior art, to avoid, even to the extent of establishing elaborate warning devices, any operation which would result in melting of the fissile fuel. The reason for avoiding such a condition is due to (1) the rather high thermal expansion coefficient and phase charge volume expansion of thorium, uranium and plutonium oxides which might cause rupture or serious weakening of the cladding containing such materials; (2) the difficulty in achieving the extremely high heat transfer rate necessary to remove energy from fissile fuel in the molten state; (3) the melting or serious weakening of claddings composed of zirconium and stainless steel alloys of the prior art at molten fuel temperatures; and (4) the general lack of know-how and techniques for achieving accurately controlled temperature gradients within and along the fissile fuel element. For these reasons, it was considered safer to avoid melting of the fuel and keep it solid and immobile within its cladding. In this static condition, certain fission products, created upon fission of the fissile fuel, have a high neutron capture cross section and would, with the possible exception of a few very volatile fission products, remain distributed throughout the fissile fuel in a generally uniform fashion. The significant high cross section fission products include, but are not limited to, krypton, xenon, iodine, cesium, ruthenium, molybdenum and rhodium. As these fission products build up in the fissile fuel mass, they tend to reduce neutron multiplication by capturing an increasing number of neutrons, removing them from the fission reaction. Thus, even though substantial amounts of fissionable fuel might be present, a high build-up of neutron-absorbing fission products in the fuel mass will eventually reduce or prevent a self-sustained fission reaction.

Summary of the invention

The process of the present invention avoids these conditions by utilizing the molten fissile fuel condition to automatically remove these fission products from the reaction zone and thus permit neutron multiplication to continue without major interference. Avoidance of problems related to fuel expansion, high heat removal rates, and melting or weakening of cladding at high temperatures, is achieved by use of latest know-how and high temperature alloys.

Generally, the process of the present invention is one whereby the temperature level and temperature gradient along the fuel element is controlled to provide a thin insulating layer of solid fissile fuel along the interior surface of the cladding, and a steep temperature gradient developed at each end of the fuel element, solidifying fuel in these regions so that a "crucible" is formed within which the molten $UO_2$ circulates under the influence of convective forces. Experimental results show that, because of the circulation, the insoluble fission products with a higher density than $UO_2$ precipitate out near the lower end of the fuel element, while the gaseous or volatile fission products collect or condense out at the uper end of the fuel element. Thus, the molten zone will contain fewer fission products to capture neutrons.

It is, therefore, an object of this invention to provide a system for operating a nuclear reactor in which the high burnup of fissile fuel is achieved.

It is another object of this invention to provide a process for operating a nuclear reactor wherein molten fissile fuel is used as the primary heat source of the reactor.

It is still another object of this invention to provide a process for operating a nuclear reactor in which the temperature within the fuel element is controlled to solidify the fuel at each end of the element and maintain a thin layer of solid fissile fuel along the interior surface of the fuel cladding.

Other and more particular objects will be apparent upon study of the following detailed description, when taken together with the accompanying drawings.

Description of the preferred embodiment

Figure 1:
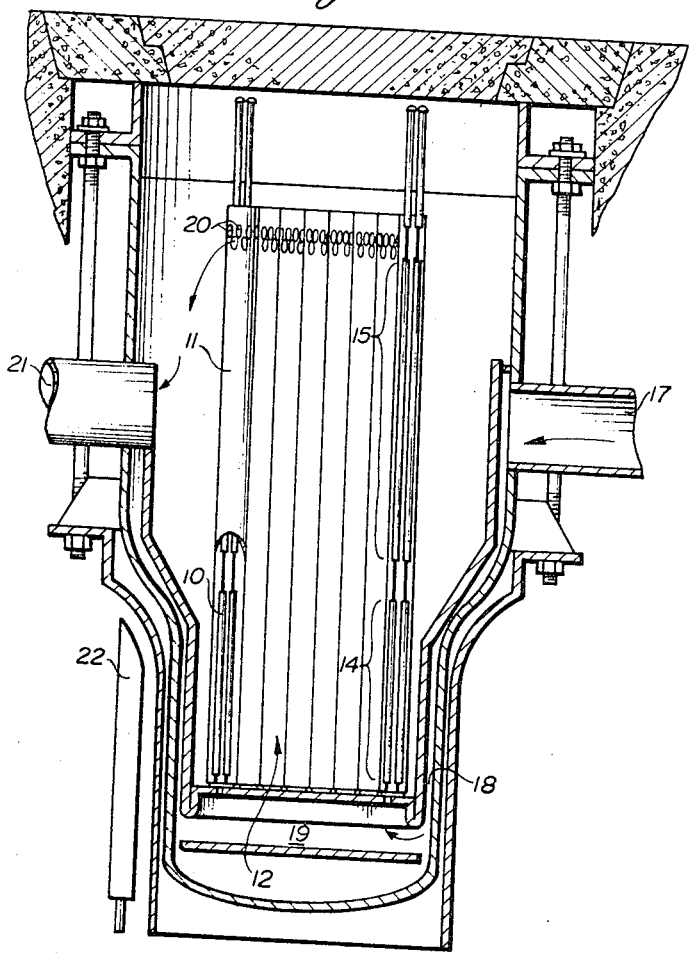
FIGURE 1 is a longitudinal section through a typical nuclear reactor in which the process of this invention can be practiced.

The apparatus for performing the process of this invention is similar to any typical nuclear reactor having a core, a cooling system, and a neutron flux control means such as neutron-absorbing control rods within the core of neutron reflectors about the periphery of the core. Such a typical nuclear reactor is illustrated in FIGURE 1, in which fissile fuel-filled rods 10 are disposed in fuel element 11, arranged to define a core 12 in which the lower portion defines a fissile fuel zone 14 (within the bracket lines), and the upper portion defines a moderator reflector zone 15. Core 12 is enclosed in a housing 16, and is provided with a coolant, for example sodium, from inlet conduit 17, which passes into channel 18, plenum 19, up through fissile fuel zone 14, where it is heated, up through moderator reflector zone 15, and out of core 12 through outlet ports 20; then out of the reactor through outlet conduit 21. For this particular reactor, neutron flux control is achieved by means of neutron reflectors 22 disposed about the periphery of housing 16 adjacent to fuel zone 14. Lowering of neutron reflectors 22 causes increased leakage of neutrons from core 12, thus reducing reactivity. Raising reflectors 22 causes more neutrons to be reflected back into fissile fuel zone 14, thus increasing reactivity.

Figure 2:
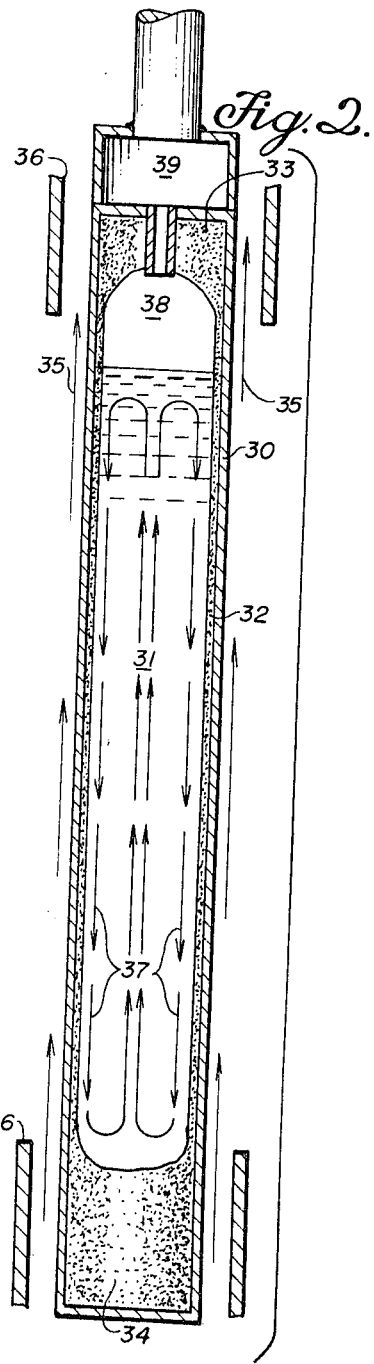
FIGURE 2 is a longitudinal section through a typical fuel rod for use in the nuclear reactor illustrated in FIGURE 1 in which the process of this invention can be practiced.

FIGURE 2 is an enlarged longitudinal section through a typical fuel element 10 at the fissile fuel zone 14 portion. It generally comprises a cladding 30 entirely enclosing the fissile fuel to form a gas-tight structure. In some cases, a vent for gaseous fission products may be provided, but for the embodiment illustrated, such gaseous fission products are intended to be retained within the fuel rod.

FIGURE 2 illustrates the typical fuel rod 10 at its preferred operating condition. The preferred fissile fuel for this embodiment is uranium oxide or a mixture of uranium oxide and plutonium oxide or uranium oxide and thorium oxide. For the embodiment using uranium oxide, the central portion 31 is held in the molten state generally above 2800° C. A thin layer 32 of solidified fissile fuel is maintained by adjusting the fuel rod heat rating and heat flow path conductivity along the inner surface of cladding 30 to act as an insulator to prevent molten fuel from contacting cladding 30. Cladding 30 may be either stainless steel or zirconium, which is maintained at a maximum temperature appropriate for the metal in the specific design by adequate coolant flow.

Upper end solidified fuel portion 33 and lower end solidified fissile fuel portion 34 are also maintained at below 2800° C. The technique for maintaining such temperature may be through the combined use of coolant flow, as indicated by arrows 35, and neutron-absorbing shims 36 disposed proximate or within the upper and lower ends of fuel rod 10 at fissile fuel zone 14. In general, with liquid sodium as a coolant, the heat flux that must be removed is about $2 \times 10^6$ B.t.u./hr./ft.$^2$, with coolant at a temperature between 200 and 300° C. By adjusting reflectors 22 and the rate of coolant flow to remove this amount of heat based on the number of fuel rods in the core, a central melting condition as illustrated can be obtained.

When the above operating conditions are met, the molten fissile fuel will tend to flow by convection within molten zone central portion 31 in a direction indicated by arrows 37. The molten fuel near the center of central portion 31 will rise since it is hotter and lighter, while the molten fuel adjacent to solid layer 32 will fall since it is cooler and heavier. The gaseous fission products, such as xenon and krypton, will rise to occupy upper void region 38 defined by solid fuel portion 33, or escape further through cracks or pellet interfaces to a gas plenum 39 provided for this purpose. In addition, the volatile fission products, such as iodine and cesium, plus other alkaline earths, will also rise to region 38 and tend to condense or collect therein along the inner surface of solid fuel portion 33. It has been found, experimentally, that the noble fission products, ruthenium, molybdenum and rhodium, tend to deposit out in metallic form at the bottom of molten zone 31 on solid fissile fuel portion 34. Thus, these neutron-absorbing fission products are removed from the main reaction region, i.e., the molten zone central portion 31 of fuel rod 10.

It will be further noted that, by virtue of the convection of the fuel in molten zone central portion 31, there is a more uniform temperature distribution along cladding 30 to afford a more uniform and efficient heat removal by the sodium coolant.

The process of this invention is, therefore, comprised of the steps of exposing fissile fuel-filled rods 10 to a neutron flux radiation, controlling said neutron flux with neutron reflectors 22 and shims 36 simultaneously with controlling the rate of flow of sodium coolant along the exterior surface of cladding 30 of rod 10, to create a temperature gradient beginning at a point proximate each end of said rod 10, and extending to the other end of said rod 10, decreasing toward each end to melt the fissile fuel in central portion 31 and obtain a layer 32 of solidified fuel along the inside surface of cladding 30, and a solidified fuel portion 33 proximate the upper end of rod 10, and a solidified fuel portion 34 proximate the lower end of rod 10, whereby the gaseous and volatile neutron-absorbing fission products collect and deposit in region 38 defined by the inside surface of solid fuel portion 33, while the solid neutron-absorbing fission products collect at solid fuel portion 34 proximate the lower end of rod 10, so that a high fuel burnup is achieved by removal of neutron-absorbing fission products from the reaction zone central portion 31.

Although the foregoing embodiment has been described in detail, there are obviously many other embodiments and variations in configuration which can be made by a person skilled in the art without departing from the spirit, scope or principle of this invention. Therefore, this invention is not to be limited except in accordance with the scope of the appended claims.

What is claimed is:

1. A process for operating a nuclear reactor wherein gaseous and solid fission products are automatically removed and high fuel burnup is obtained, the steps comprising irradiating with neutrons at least one vertically disposed, elongated tubular member containing a fissile fuel; controlling said irradiation to melt said fissile fuel and to create a temperature gradient beginning at a point proximate each end of said tubular member and extending to said ends, decreasing toward each end; simultaneously cooling said tubular member along the exterior surface thereof to solidify said fissile fuel proximate each end of said tubular member and to form a coating of solid fissile fuel between the inside surface of said tube and said melted fissile fuel whereby volatile and gaseous neutron-absorbing fission products collect proximate the upper end of said tube and the insoluble neutron-absorbing fission products collect proximate the lower end of said tube, and a high burnup of fissile fuel is achieved for the melted fissile fuel.

2. The process as defined in claim 1, wherein said fissile fuel is selected from the group consisting of uranium oxide, plutonium oxide, and thorium oxide.

3. The process as defined in claim 1, wherein said temperature is below 2800° C. proximate each end of said tubular member, and above 2800° C. proximate the central portion of said member.

References Cited

UNITED STATES PATENTS

| 2,853,446 | 9/1958 | Abbott et al. | 176—68 |
| 3,085,966 | 4/1963 | Flora | 176—68 |
| 3,398,051 | 8/1968 | Seltorp | 176—49 |

CARL D. QUARFORTH, *Primary Examiner.*

H. F. BEHREND, *Assistant Examiner.*

U.S. Cl. X.R.

176—49, 68, 89